United States Patent [19]

Daniel et al.

[11] Patent Number: 5,461,104
[45] Date of Patent: Oct. 24, 1995

[54] PROCESS FOR MAKING WATER-BASED LATEXES OF BLOCK COPOLYMERS

[75] Inventors: Mervyn F. Daniel, Moorsel, Belgium; Kenneth R. Cox, Houston, Tex.

[73] Assignee: Shell Oil Company, Houston, Tex.

[21] Appl. No.: 184,629

[22] Filed: Jan. 21, 1994

[51] Int. Cl.$^6$ .................................................. C08L 53/02
[52] U.S. Cl. .................. 524/505; 524/506; 524/515; 524/516; 524/521; 524/522; 524/523; 524/524; 524/377
[58] Field of Search .................................. 524/505, 506, 524/515, 516, 521, 522, 523, 524, 377

[56] References Cited

U.S. PATENT DOCUMENTS

| | | |
|---|---|---|
| 3,751,402 | 8/1973 | Broering. |
| 3,759,859 | 9/1973 | Steinwand. |
| 4,177,177 | 12/1979 | Vanderhoff et al. ............... 260/29.2 M |
| 4,333,970 | 6/1982 | Blommers et al.. |
| 4,525,525 | 6/1985 | Höfer et al.. |
| 4,734,445 | 3/1988 | Noda et al.. |
| 4,978,707 | 12/1990 | Tanaka et al.. |

FOREIGN PATENT DOCUMENTS

| | | |
|---|---|---|
| 0048879 | 4/1982 | European Pat. Off.. |
| 0249554 | 12/1987 | European Pat. Off.. |
| 2905651 | 8/1980 | Germany. |
| J51023-532 | 8/1974 | Japan. |
| J52032-937 | 3/1977 | Japan. |
| J52068-249 | 6/1977 | Japan. |
| J58138-764-A | 8/1983 | Japan. |
| J59036-176-A | 2/1984 | Japan. |
| J61051-004-A | 3/1986 | Japan. |
| 1260720 | 1/1972 | United Kingdom. |

*Primary Examiner*—Edward Cain
*Attorney, Agent, or Firm*—Donald F. Haas

[57] ABSTRACT

This invention is a process for producing stable polymer emulsions and latexes with an average particle size of less than one micron. The polymers are block copolymers of conjugated dienes and vinyl aromatic hydrocarbons which may or may not contain polar functionality. The process comprises making a polymer cement of the polymer and a blend of a solvent for the polymer, emulsifying the polymer cement by combining adding it with an aqueous phase containing an emulsifier which is a nonionic surfactant having a number average molecular weight of less than 1600 and an HLB of 9.5 to 16 and a stabilizer which is a nonionic surfactant having a molecular weight greater than 1600.

8 Claims, 1 Drawing Sheet

PROCESS FOR MAKING WATER-BASED LATEXES OF BLOCK COPOLYMERS

BACKGROUND OF THE INVENTION

This invention relates to the production of fine stable latexes of block copolymers of vinyl aromatic hydrocarbons and conjugated dienes. More specifically, it relates to the production of such latexes which have fine particle sizes and low surfactant to polymer ratios by using appropriate blends of nonionic surfactants.

It is known that a block copolymer can be obtained by an anionic copolymerization of a conjugated diene compound and an alkenyl arene compound by using an organic alkali metal initiator. Block copolymers have been produced which comprise blocks of these different monomers such as configurations which are linear, radial or star, i.e. many arms radiating from a central core. The proportion of thermoplastic blocks to elastomeric blocks and the relative molecular weights of each of these blocks is balanced to obtain a rubber having unique performance characteristics.

It has been found advantageous to prepare latexes of these polymers in order to obtain products that can be formed into coatings and adhesive films. Preparation of such latexes is well known to those skilled in the art (see U.S. Pat. Nos. 3,360,599, 3,238,173 and 3,726,824). Latexes of polyvinyl aromatic—polydiene block copolymers are conventionally made by (1) dissolving the block copolymer in an organic solvent or solvents to form a polymer cement, (2) emulsifying the polymer cement in an aqueous solution containing one or more surfactants, and (3) stripping the emulsion of organic and excess aqueous liquids to form a stable, suitably concentrated latex. Polymer cements are often available directly from the polymerization reactor.

Prior art block copolymer cement solutions that are to be emulsified typically contain from 5 to 30 weight percent polymer. It is advantageous for the polymer concentration in the cement to be as high as possible. Increasing the polymer concentration in the cement reduces the amount of solvent and excess water that must be removed following emulsification. It also reduces the surfactant to polymer ratio in the final latex. Surfactants are usually present such that the total concentration of surfactants ranges from about 0.5 to more than 50 parts per hundred rubber (phr), where the rubber is the block copolymer and phr is based on 100 parts by weight of the rubber. A high surfactant concentration can negatively impact adhesive properties of coatings and adhesives. For these reasons, it would be advantageous to be able to have a high solids content latex.

Ionic surfactants have been used as emulsifiers for block copolymer cement solutions. Very good results in terms of particle size are sometimes achieved using such ionic surfactants. However, latexes made with ionic surfactants are generally only able to achieve a solids content of 40 to 45 percent. Further, such latexes have a problem with freeze-thaw stability, i.e. after the latex is frozen, it does not return to its original state and is not redispersible. Such latexes are also sometimes pH sensitive in that they may coagulate in lower or higher pH water. Further, such latexes are sometimes very sensitive to the hardness of the water in which they are emulsified. They do, however, exhibit good long term stability. It would be advantageous to have a latex which exhibited long term stability and was able to achieve a higher solids content and exhibit good freeze-thaw stability, low pH sensitivity and low water hardness sensitivity.

Fine polymer cement emulsions are necessary in order to make fine latexes. Fine particle size latexes are advantageous because particles remain stable and dispersed with less surfactant. Large particles tend to either settle or cream depending on the density of the cement relative to the aqueous phase. It is also known that small particle sizes in latexes can enhance coating and adhesive performance. Thus, it is highly advantageous to be able to produce a stable polymer cement emulsion with a small average drop size, for example, one micron or less, without the formation of appreciable amounts of multiple emulsions.

SUMMARY OF THE INVENTION

This invention provides a process for producing stable polymer latexes with an average particle size of no more than one micron. The process comprises first making a polymer cement of a block copolymer of a conjugated diene and a vinyl aromatic hydrocarbon and a solvent for the block copolymer. Then the polymer cement is emulsified at 0° C. to 60° C. by combining it with an aqueous phase containing from 0.1 to 4.0 weight percent of the total emulsion of an emulsifier and from 0.1 to 4.0 weight percent of the total emulsion of a stabilizer. To produce the latex, solvent and excess water are then removed from the emulsion. The emulsifier has an HLB number of from 9.5 to 16 and is comprised of at least one nonionic surfactant having a number average molecular weight of from 260 to 1600 wherein the hydrophobe and hydrophile contribute 130 to 320 and 130 to 1275, respectively, to the molecular weight. The stabilizer is comprised of at least one nonionic block copolymer surfactant having a number average molecular weight greater than 1600 and at least 1000 for each hydrophilic arm of the polymer. The invention also encompasses stable emulsions and latexes made by this process.

DETAILED DESCRIPTION OF THE INVENTION

Figure 1:
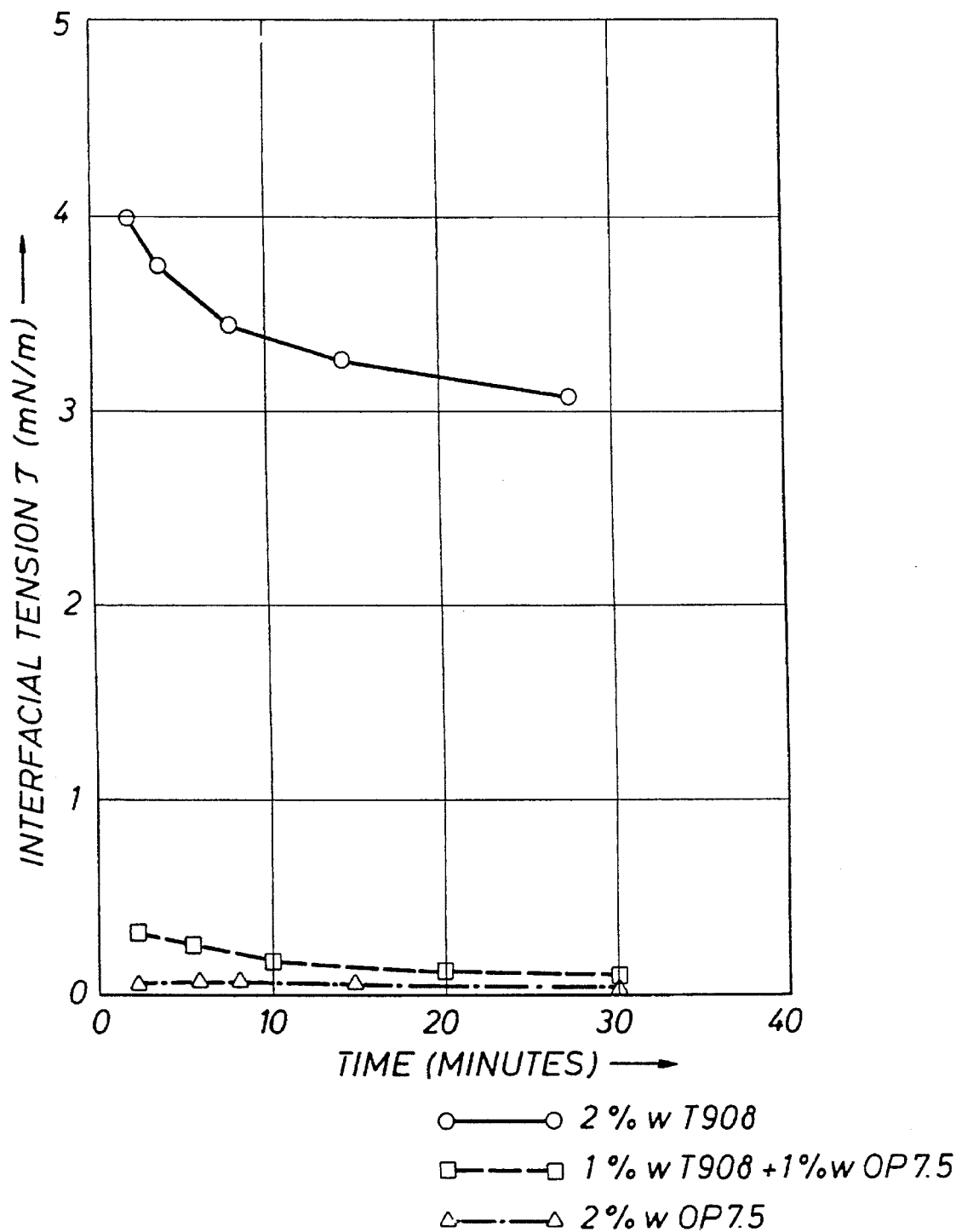
FIG. 1 is a plot of interfacial tension versus time for three emulsions utilizing a stabilizer only, an emulsifier only and a combination of the two.

As is well known, polymers containing both aromatic and ethylenic unsaturation can be prepared by copolymerizing one or more polyolefins, particularly a diolefin, in this case butadiene and isoprene, with one or more alkenyl aromatic hydrocarbon monomers, in this case styrene. Other diolefins such as 2,3-dimethyl-1,2-butadiene, 1,3-pentadiene, 1,3-hexadiene and the like, and other vinyl aromatic hydrocarbons such as o-methylstyrene, p-methylstyrene, p-tertbutylstyrene, 1,3-dimethylstyrene, alphamethyl styrene, vinylnaphthalene, vinylanthracene and the like may be used. The copolymers may, of course, be random, tapered, block or a combination of these, in this case block. The copolymers may have radial or star configurations as well.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as ABA block copolymers are frequently prepared in solution using anionic polymerization techniques. In general, when solution anionic techniques are used, these ABA block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

Wherein:

R is an aliphatic, cycloaliphatic, aromatic or alkyl-substituted aromatic hydrocarbon radical having from 1 to about 20 carbon atoms; and n is an integer of 1 to 4.

In general, many of the solvents known in the prior art to be useful in the preparation of such polymers may be used as the base solvent in cement. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, hydrocarbons such as benzene, naphthalene, toluene, xylene, and the like; hydrogenated aromatic hydrocarbons, such as tetralin, decalin and the like; halogenated hydrocarbons, particularly halogenated aromatic hydrocarbons, such as chlorobenzene, chlorotoluene and the like.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905, 3,390,207, 3,598,887 and 4,219,627 which are herein incorporated by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the appropriation of multiblock copolymers containing tapered copolymer blocks including U.S. Pat. Nos. 3,251,905, 3,265,765, 3,639,521, and 4,208,356 which are herein incorporated by reference. If desired, these block copolymers can be hydrogenated. Hydrogenation may be effected selectively as disclosed in U.S. Pat. Reissue No. 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755, which is also incorporated by reference.

The block copolymers of the present invention may be hydrogenated and unhydrogenated block copolymers which have been reacted with various acid functional group-containing molecules. The acid functional group containing molecules which may be reacted with such block copolymers to produce a functionalized block copolymer useful in the present invention include acid or anhydride groups or derivatives thereof. Functionalized polymers containing carboxyl groups reacted onto the vinyl aromatic hydrocarbon block are described in U.S. Pat. No. 4,868,245 which is herein incorporated by reference. The preferred acid monomers for functionalizing the polymers of the present invention are those which can be grafted onto the diene block of the polymer in free radical initiated reactions. Such preferred monomers include acids or anhydrides or derivatives thereof such as carboxylic acid groups and their salts, anhydrides, esters, imide groups, amide groups, acid chlorides and the like. Such monomers and functionalized polymers incorporating them are described in U.S. Pat. No. 4,578,429 which is herein incorporated by reference. The preferred modifying monomers are unsaturated mono– and polycarboxylic-containing acids and anhydrides and other derivatives thereof. Examples of such monomers include maleic acid, maleic anhydride, fumaric acid and the other materials mentioned in the above-referenced patent. Sulfonic acid functionalized polymers, such as described in U.S. Pat. No. 4,086,171 which is herein incorporated by reference, may also be used. The acid functionalized block copolymers utilized may contain at least about 0.1% of the functional groups and preferably from about 0.5% to about 30%.

The polymer cement is formed and comprises the polymer and a solvent for the polymer at a concentration of polymer of from about 20 to about 35 percent by weight although the lower limit is chosen merely for reasons of economics. The upper limit is determined by the viscosity of the cement and the solubility of the polymer. To emulsify the cement, it is usually combined with an aqueous phase containing the emulsifier and the stabilizer. Preferably, the polymer cement is added to the aqueous phase.

The emulsifier is a low molecular weight surfactant whose purpose is to make it easier to produce small droplets that are important to both stability of the emulsion and latex and to avoid undesirable creaming or settling effects. Such effects not only lead to apparent separation of the product but can also contribute to coalescence. The emulsifier reduces interfacial tension, promotes rapid emulsification and provides thermodynamic size control. It should be present in an amount from 0.1 to 4.0 weight percent of the total emulsion.

The emulsifier should have a number average molecular weight of from 260 to 1600. The hydrophobe of the emulsifier should have a number average molecular weight of at least 130 (and can go up to 320) to partition sufficient emulsifier to the emulsion droplet interfaces. The number average molecular weight (130 to 1275) of the hydrophile is chosen to sufficiently lower the interfacial tension between the bulk and dispersed phases in the emulsion. The molecular weight could be higher than 1600 but it is unnecessary to use a higher molecular weight material here and doing so would increase the cost of the emulsion without providing any significant functional advantages. The same number of molecules are necessary to provide the advantage of lowering the interfacial tension whatever the length of those molecules.

The emulsifier is a nonionic surfactant material. As with all such materials, it is basically comprised of a hydrophile and a hydrophobe in the same molecule. Poly(oxyethylene)s are good choices for the hydrophile. The hydrophobe may be linear or branched alkane or alkylphenyl ethoxylates. Preferred emulsifiers include octylphenyl ethoxylate and nonylphenyl ethoxylate. Mixtures of these emulsifiers may be used as long as the molecular weight limitations are observed and the mixture has the proper hydrophilic-lipophilic balance.

It is highly preferred that the emulsifier be chosen such that the hydrophilic-lipophilic balance (HLB) of the emulsion system be such that the system will form a stable oil-in-water emulsion rather than a water-in-oil emulsion. The HLB number varies with temperature and the organic solvent used in the polymer cement. For the polymers of the present invention over the temperature range of the process of the present invention, 0° C. to 60° C., the proper HLB number ranges from 9.5 to 16. For instance, to form an emulsion from a polymer cement containing cyclohexane at 0° C., an emulsifier with an HLB of 10.2 would be preferred. At 60° C., the HLB would be about 12.8. At intermediate temperature, linear extrapolation with temperature allows one to estimate the required HLB. The HLB numbers for aromatic solvents may be several units higher. Thus, first the temperature and cement solvent are chosen, and then the HLB is determined.

The HLB number can be determined by a simple calculation since it is related to the molecular weight of the hydrophile portion of the emulsifier relative to the total molecular weight of the emulsifier. Thus, the HLB number can be determined by the following formula $$HLB\ no. = 20 \times \left( \frac{MW(hydrophile)}{MW(total\ emulsifier)} \right)$$

In addition, the HLB numbers of many surfactants are provided in the literature, for example, *Emulsions and Solubilization* by K. Shinoda and S. Friberg, published by John Wiley and Sons in 1986, which is herein incorporated by reference.

The stabilizer is a nonionic polymeric surfactant which has a number average molecular weight greater than 1600 and at least 1000 for each hydrophilic arm of the polymer. As with the emulsifier, this polymeric material may be either linear or branched. It may also have either a single polymeric hydrophilic arm or several polymeric hydrophilic arms radiating from a central hydrophobic core. A stabilizer with a single hydrophilic arm will have hydrophobic chain at the opposite end of the polymer.

The purpose of the stabilizer is to prevent flocculation of the emulsion. In other words, if the stabilizer is performing its function, the small droplets will not agglomerate to form larger droplets. If this agglomeration continues long enough, the emulsion will become unstable and cream out into phases. Such flocculation often occurs during shipping and/or storage over a long period of time. The stability of the emulsion in terms of critical flocculation point is relatively independent of the molecular weight of the stabilizer as long as it is greater than 1600 and the molecular weight of each hydrophilic arm is at least 1000. If these molecular weights are lower, then the length of the molecule is insufficient to hold the emulsion together over a long period of time.

The stabilizer comprises from 0.1 to 4.0 weight percent of the total emulsion. If less than 0.1 weight percent is present, then there is insufficient stabilizer to prevent flocculationo Concentrations greater that 4.0 weight percent can be used, but are unnecessary for stability and would add unnecessarily to the cost of the emulsion. Total emulsion as used throughout this specification refers to the concentration prior to solvent stripping, not the final emulsion.

There are a wide variety of block copolymers which could be used as the stabilizer in the present invention. The stabilizer block copolymer is generally comprised of an anchor moiety portion and a stabilizing moiety portion. The choice of the anchor polymer depends on the stability of the anchor in the cement phase. The anchor should be either soluble in the dispersed phase of the emulsion or strongly adsorbed at the emulsion droplet interface over the temperature range at which the emulsion must remain stable. The temperature range is determined by the shipping and storage requirements for the emulsion and, in this case, we are attempting to provide an emulsion which is stable up to 60° C. The molecular weight of the anchor polymer must be sufficiently high that it thermodynamically favors adsorbing to the dispersed emulsion droplets over dissolving in the continuous phase of the emulsion. The anchor polymer must be relatively insoluble in the aqueous phase. Examples of anchor polymers which can be used in the present invention include poly(oxypropylene), polystyrene, poly(vinylacetate), poly(methylmethacrylate), poly(acrylonitrile), poly(dimethylsiloxane), poly(vinylchloride), polyethylene, polypropylene, and poly(laurylmethacrylate).

In order to be effective, the stabilizing moiety portion of the block copolymer must be either soluble or strongly absorbed in the aqueous phase at the temperature range over which the emulsion must remain stable. The effectiveness of the stabilizing moiety is dependent upon the theta temperature of that moiety in water. The theta temperature is a measure of incipient phase separation in a polymer-solvent system. It is formally defined as the point at which the second virial coefficient of the osmotic expansion becomes zero. For instance, emulsions stabilized with poly(oxyethylene) are expected to have stability up to 41° C. to 57° C. because the values for the theta temperature for poly(oxyethylene) polymer in water have been measured to fall within that range. Theta temperatures of various polymers are easily measured by light scattering or osmotic pressure measurements and are published in a variety of sources, for example, *Pollymeric Stabilization of Colloidal Dispersions* by D. H. Napper, published by Academic Press in 1983 which is herein incorporated by reference.

Preferably the anchor moiety is selected from the group consisting of poly(oxypropylene), polystyrene, poly(vinylacetate), poly(methylmethacrylate), poly(acrylonitrile), poly(dimethylsiloxane), poly(vinylchloride), polyethylene, polypropylene and poly(laurylmethacrylate). The stabilizing moiety portion is preferably selected from the group consisting of poly(oxyethylene), poly(vinylalcohol), poly(acrylic acid), poly(methacrylic acid), poly(acrylamide), poly(vinylpyrrolidone), poly(ethyleneimine), poly(vinylmethylether) and poly(4-vinylpyridine).

Stable dispersions of functionalized polymer in water can be produced using the following three surfactant systems which are not systems which utilize high and low molecular weight nonionic surfactants. The first system simply uses an ammonium salt of a sulfated nonyl-phenol ethoxylate (30 EO groups). The second system utilizes a blend of sodium lauryl sulfate with an ethylene oxide-propylene oxide block copolymer. The third system utilizes an octyl-phenol ethoxylate with an ethylene oxide-propylene oxide block copolymer. The systems are especially useful for functionalized polymers and show excellent resistance to settling or creaming. For instance, a stable dispersion of a functionalized block copolymer of styrene and butadiene containing 1.8 percent maleic anhydride was formed using 2.7 parts per hundred of Alipal EP-120, an ammonium salt of sulfated nonylphenyl ethoxylate, an anionic surfactanto A second emulsion was formed using 2.7 parts per hundred of sodium lauryl sulphate with 4 parts per hundred ethylene oxide/propylene oxide block copolymer. A third emulsion was prepared with 2.7 parts per hundred of octylphenyl ethyoxylate with 4 parts per hundred of the same ethylene oxide/propylene oxide block copolymer.

Emulsions can be prepared by contacting the aqueous surfactant solution and the polymer cement under conditions of high shear. Typical emulsification equipment includes the following: sonic horn, colloid mill, homogenizer, liquid whistle and high shear mixer. The amount of energy required to form an emulsion with a given average drop size depends largely upon the interfacial tension between the cement phase and the aqueous phase and the viscosity of the cement phase. Low interfacial tensions and low cement viscosities require less mixing energy to achieve a desired average drop size.

It is preferred, although not necessary, that the polymer cement be emulsified by adding the cement slowly to a known volume of water containing surfactant which is agitated using a suitable emulsification device. This procedure promotes the efficient preparation of cement-in-water emulsions with small average drop sizes. Another preferred element of the process is that the minimal surfactant level consistent with stable emulsions and latexes is used to minimize foaming during solvent stripping. The final emulsion may contain up to 75 weight percent of the cement as the dispersed phase. This is an aqueous phase to cement ratio of 1:3.

The solvent is removed from the emulsion by standard flashing or stripping techniques. The temperature of stripping can range from 25° to 100° C. and the stripping pressure can range from 760 down to 10 millimeters of mercury. It is preferred to flash solvent by reducing the pressure on the emulsion and increasing the emulsion temperature moderately. Excess water may be removed at the same time or later in order to concentrate the resulting latex to the desired percent solids. Alternately, the latex can be concentrated using conventional centrifugation techniques or by creaming. Sufficient water is removed to concentrate the latex to from 15 weight percent polymer to 70 weight percent polymer.

The process of the present invention produced block copolymer latexes which are very stable and fine, i.e., have average particle sizes of less than one micron. Such polymer latexes are useful for producing water-borne coatings containing little or no solvent, and formulating into water-based adhesives including pressure sensitive adhesives, contact adhesives, and construction mastic adhesives.

EXAMPLE 1

Aqueous polymer dispersions were prepared by first making polymer/cyclohexane-in-water emulsions using a Branson Ultrasonicator and then "stripping off" the cyclohexane with a vacuum rotary evaporator. The ingredients were emulsified in the ratio of 78% by weight water: 16% by weight cyclohexane: 4% by weight polymer: 1% by weight higher molecular weight surfactant: 1% by weight lower molecular weight surfactant.

The polymer was a linear hydrogenated styrene-butadiene-styrene block copolymer having a molecular weight of about 75,000, the surfactants were essentially nonionic block copolymers of polypropylene oxide and polyethylene oxide—the stabilizers were T908 (number average molecular weight 26,000) and OP40 (number average molecular weight 1966) and the emulsifier was OP7.5 (number average molecular weight 536). Solvent stripping was carried out at 40° to 50° C. and 100 to 190 millimeters of mercury and coagulum formation was negligible. The samples were concentrated by centrifugation (3350 grams for 10 minutes), redispersed in ultra pure water and then reconcentrated using the same procedure to give samples with about 55% by weight solids content.

The latexes formed were all stable. The mean particle sizes were submicron as shown in Table 1 below.

TABLE 1

| Sample | Surfactant | Mean Particle Size (μm) |
| --- | --- | --- |
| 1 | OP40 + OP7.5 | 0.33 |
| 2 | OP40 + OP7.5 | 0.33 |
| 3 | T908 + OP7.5 | 0.4 |
| 4 | T908 + OP7.5 | 0.41 |

All four samples satisfied freeze-thaw stability tests including successful redispersion yielding emulsions with viscosity increases less than 60 percent.

EXAMPLE 2

Three equivalent emulsions were made using a hydrogenated block copolymer of styrene and butadiene. The formulation comprised 78 percent water, 2 percent total emulsifier and/or stabilizer, 16 percent cyclohexane and 4 percent polymer. All percentages are weight percent. One emulsion utilized only the stabilizer T908. Another contained only the emulsifier OP7.5. The third contained one weight percent of each.

The interfacial tension for each of the emulsions was determined over a period of time by the spinning drop method. The data were plotted and are shown in FIG. 1. It can be seen that the interfacial tension of the emulsion made with only the stabilizer was much higher than the others, an undesirable result because high interfacial tensions inhibit the formation of small emulsion droplets. The interfacial tensions of the emulsifier only and the combination emulsions were much lower. However, the emulsion used preparing the emulsifier only was much less stable with respect to coalescence than the emulsion prepared with the stabilizer only and the emulsion prepared with both. Therefore, it is clear that it is preferred to use a combination of the stabilizer and the emulsifier to achieve the advantages of the present invention.

EXAMPLE 3

This example compares an emulsion made with an ionic surfactant with an emulsion made with nonionics as described in Example 1. The first emulsion was prepared using a linear styrene-butadiene-styrene block copolymer and ionic surfactant. The emulsion comprised 43 weight percent polymer and had an average particle size of 1 to 3 microns.

The emulsion containing the ionic surfactant was only able to achieve 43 percent solids whereas the emulsions of the present invention were able to achieve 55 to 60 weight percent solids. When frozen, the emulsion containing the ionic surfactant did not return to its original state and was not redispersible. On the other hand, the emulsions made according to the present invention were redispersible after freezing and returned to their original state and appearance. The ionic surfactant emulsion was sensitive to pH. A concentrate of the emulsion coagulated in 4 and 10 pH adjusted water. The unconcentrated emulsion was dispersible in 10 pH water but coagulated in 4 pH water. The concentrates of the emulsions of the present invention redispersed in both 4 and 10 pH adjusted water. The concentrate of the ionic surfactant emulsion coagulated in both high purity and 500 ppm hard water. The unconcentrated emulsion redispersed into high purity water but coagulated in 500 ppm hard water. On the other hand, both the concentrates and the unconcentrated emulsions of the present invention redispersed into both high purity and 500 ppm hard water. Both emulsions exhibited good long term stability.

We claim:

1. A process for producing stable polymer latexes with an average particle size of no more than one micron, which comprises:
   (a) making a polymer cement of a block copolymer of a conjugated diene and a vinyl aromatic hydrocarbon and a solvent for the block copolymer;
   (b) emulsifying the polymer cement at 0° C. to 60° C. by combining it with a blend of an emulsifier and a stabilizer wherein the emulsifier comprises from 0.1 to 4.0 weight percent of the total emulsion, has an HLB number of from 9.5 to 16 and is comprised of at least one nonionic surfactant having a number average molecular weight of from 250 to 1600; and the stabilizer comprises from 0.1 to 4.0 weight percent of the total emulsion and is comprised of at least one nonionic block copolymer surfactant having a number average molecular weight greater than 1600 and at least 1000 for each hydrophilic arm of the stabilizer; and
   (c) removing solvent and excess water from the emulsion.

2. The process of claim 1 wherein the emulsifier is comprised of a hydrophile portion and a poph portion and the hydrophile portion is poly(oxyethylene) and the lipophile portion is selected from the group consisting of linear and branched alkane and alkylphenyl ethoxylates.

3. The process of claim 1 wherein the stabilizer is comprised of an anchor moiety portion and a stabilizing moiety portion and the anchor moiety portion is selected from the group consisting of poly(oxypropylene), polystyrene, poly(vinylacetate), poly(methylmethacrylate), poly(acrylonitrile), poly(dimethylsiloxane), poly(vinylchloride), polyethylene, polypropylene and poly(laurylmethacrylate); and the stabilizing moiety portion is selected from the group consisting of poly(oxyethylene), poly(vinylalcohol), poly(acrylic acid), poly(methacrylic acid), poly(acrylamide), poly(vinylpyrrolidone), poly(ethyleneimine), poly(vinylmethylether) and poly(4-vinylpyridine).

4. A process for producing stable polymer emulsions with an average particle size of no more than 1 micron, which comprises:
   (a) making a polymer cement of a block copolymer of a conjugated diene and a vinyl aromatic hydrocarbon and a solvent for the block copolymer; and
   (b) emulsifying the polymer cement at 0° C. to 60° C. by combining it with a blend of an emulsifier and a stabilizer wherein the emulsifier comprises from 0.1 to 4.0 weight percent of the total emulsion and has an HLB number of from 9.5 to 16 and is comprised of at least one nonionic surfactant having a number average molecular weight of from 250 to 1600; and the stabilizer comprises from 0.1 to 4.0 weight percent of the total emulsion and is comprised of at least one nonionic block copolymer surfactant having a number average molecular weight greater than 1600 and at least 1000 for each hydrophilic arm of the stabilizer.

5. The process of claim 4 wherein the emulsifier is comprised of a hydrophile portion and a lipophile portion and the hydrophile portion is poly(oxyethylene) and the lipophile portion is selected from the group consisting of linear and branched alkane and alkylphenyl ethoxylates.

6. The process of claim 4 wherein the stabilizer is comprised of an anchor moiety portion and a stabilizing moiety portion and the anchor moiety portion is selected from the group consisting of poly(oxypropylene), polystyrene, poly(vinylacetate), poly(methylmethacrylate), poly(acrylonitrile), poly(dimethylsiloxane), poly(vinylchloride), polyethylene, polypropylene and poly(laurylmethacrylate); and the stabilizing moiety portion is selected from the group consisting of poly(oxyethylene), poly(vinylalcohol), poly(acrylic acid), poly(methacrylic acid), poly(acrylamide), poly(vinylpyrrolidone), poly(ethyleneimine), poly(vinylmethylether) and poly(4-vinylpyridine).

7. The product of the process of claim 1.

8. The product of the process of claim 4.

* * * * *